United States Patent
Cheng et al.

(10) Patent No.: US 11,249,745 B2
(45) Date of Patent: Feb. 15, 2022

(54) IMAGE UPGRADE METHOD AND DEVICE

(71) Applicant: HUAWEI TECHNOLOGIES CO., LTD., Guangdong (CN)

(72) Inventors: Baochuan Cheng, Dongguan (CN); Jianrui Yang, Dongguan (CN); Le Lin, Dongguan (CN); Gaosheng Cui, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/824,391

(22) Filed: Mar. 19, 2020

(65) Prior Publication Data

US 2020/0218529 A1 Jul. 9, 2020

Related U.S. Application Data

(63) Continuation of application No. PCT/CN2018/102728, filed on Aug. 28, 2018.

(30) Foreign Application Priority Data

Sep. 22, 2017 (CN) .......................... 201710868013.4

(51) Int. Cl.
*G06F 8/65* (2018.01)
*G06F 8/61* (2018.01)
*G06F 9/50* (2006.01)

(52) U.S. Cl.
CPC .................. *G06F 8/65* (2013.01); *G06F 8/63* (2013.01); *G06F 9/5055* (2013.01)

(58) Field of Classification Search
CPC ... G06F 8/65; G06F 8/63; G06F 8/658; G06F 9/5055
See application file for complete search history.

(56) References Cited

U.S. PATENT DOCUMENTS 7,814,478 B2 * 10/2010 Friedman .................. G06F 8/65
717/173
8,386,733 B1 * 2/2013 Tsaur ...................... G06F 16/11
711/163

(Continued)

FOREIGN PATENT DOCUMENTS

| CN | 102193807 A | 9/2011 |
| CN | 103092648 A | 5/2013 |
| CN | 106227579 A | 12/2016 |
| CN | 106528224 A | 3/2017 |
| CN | 107015995 A | 8/2017 |

(Continued)

OTHER PUBLICATIONS

Zielinski et al., "Adaptive SOA Solution Stack", 2012, IEEE vol. 5, No. 2 (Year: 2012).*

(Continued)

*Primary Examiner* — Wei Y Zhen
*Assistant Examiner* — Junchun Wu
(74) *Attorney, Agent, or Firm* — Womble Bond Dickinson (US) LLP

(57) ABSTRACT

An image upgrade method is provided. The method includes: receiving an incremental image file of a container, where the incremental image file includes a newly-added file, a modified file, and information about a deleted file, and the information about the deleted file includes a name of each deleted file and a storage path of the deleted file; updating an original image layer based on the incremental image file to obtain an updated image layer, where a state of the deleted file is set to a hidden state at the updated image layer; and overlaying a file at the updated image layer with a file at a container data layer to form an updated unified view at a view layer for use by the container, where the updated unified view does not include the deleted file whose state is set to the hidden state.

20 Claims, 4 Drawing Sheets

(56) References Cited

U.S. PATENT DOCUMENTS

| | | | |
|---|---|---|---|
| 10,120,671 B1* | 11/2018 | Li | G06F 9/45545 |
| 10,152,387 B1* | 12/2018 | Chakraborty | G06F 9/45558 |
| 10,552,133 B2* | 2/2020 | Yang | G06F 8/60 |
| 10,832,462 B2* | 11/2020 | Gong | G06T 11/60 |
| 2008/0235266 A1* | 9/2008 | Huang | G06F 8/658 |
| 2015/0254069 A1* | 9/2015 | Ito | G06F 13/00 |
| | | | 717/174 |
| 2017/0249127 A1* | 8/2017 | Parees | G06F 8/71 |
| 2017/0249140 A1 | 8/2017 | Sun | |
| 2017/0277524 A1* | 9/2017 | Bhat | G06F 8/63 |
| 2017/0300697 A1* | 10/2017 | Iyer | G06F 21/577 |
| 2018/0075152 A1* | 3/2018 | Zhang | G06Q 20/16 |
| 2018/0088926 A1* | 3/2018 | Abrams | H04L 67/34 |
| 2018/0095973 A1* | 4/2018 | Huang | G06F 8/63 |
| 2018/0129479 A1* | 5/2018 | McPherson | G06F 9/45558 |
| 2018/0285210 A1* | 10/2018 | Mitkar | G06F 11/3006 |
| 2020/0218529 A1* | 7/2020 | Cheng | G06F 8/658 |

FOREIGN PATENT DOCUMENTS

| | | | | |
|---|---|---|---|---|
| WO | 2011022388 A1 | 2/2011 | | |
| WO | WO-2011022388 A1 * | 2/2011 | | G06F 8/60 |

OTHER PUBLICATIONS

Mesinger et al., "An upgraded version of the Eta model", 2012, Springerlink.com (Year: 2012).*

Kratzke et al., "ClouNS—A Cloud-native Application Reference Model for Enterprise Architects", Sep. 2017, IEEE (Year: 2017).*

Jeong et al., "Incremental data integration based on hierarchical metadata registry with data visibility", 2003, Elsevier Inc. (Year: 2003).*

Jinbang Li et al.,"Learning Docker Step by Step", China Machine Press,dated Nov. 30, 2016,total 243 pages.

Anonymous et al.,"Docker—from entry to practice", dated May 13, 2017,total 3 pages.

* cited by examiner

IMAGE UPGRADE METHOD AND DEVICE

CROSS-REFERENCE TO RELATED APPLICATIONS

This application is a continuation of International Application No. PCT/CN2018/102728, filed on Aug. 28, 2018, which claims priority to Chinese Patent Application No. 201710868013.4, filed on Sep. 22, 2017. The disclosures of the aforementioned applications are hereby incorporated by reference in their entireties.

TECHNICAL FIELD

The present application relates to the field of container technologies, and in particular, to an image upgrade method and a device.

BACKGROUND

As container technology is becoming more mature, container technology is more commonly applied in various fields. In an internet of things, in consideration of power consumption and costs, there are relatively few hardware resources for an internet of things device. Therefore, as a lightweight virtualization technology, container technology is very suitable for the internet of things device. Container technologies such as Docker and a Linux container (LXC) are compared, and the Linux container is lighter and more convenient, and is more suitable to be applied to the internet of things.

Generally, a container is a simplified Linux operating system, and an image is software loaded into the container. When a function of the container needs to be enhanced, the image corresponding to the container needs to be upgraded. Currently, Docker provides an image management method. In combination with DockerHub, it may be very convenient to manage an image of a Docker container and implement an incremental image upgrade. However, the image management method for the Docker container is not suitable for the internet of things device. The LXC currently does not support an incremental image upgrade. To upgrade an image of the Linux container, a complete image needs to be downloaded to a device. In this case, bandwidth is wasted, and disk resources on the device are also wasted. Consequently, an upgrade is time-consuming and inefficient.

SUMMARY

The present application is used to resolve a prior-art problem that because a Linux container does not support an incremental image upgrade, bandwidth and disk resources are wasted and upgrade efficiency is low during an image upgrade.

A first aspect of the embodiments of the present application provides an image upgrade method, where the method is applied to a container, the container includes a view layer, a container data layer, and an original image layer, the original image layer includes a first sublayer to an $n^{th}$ sublayer, and the view layer, the container data layer, and the first sublayer to the $n^{th}$ sublayer are sequentially located in the container, where $n \geq 1$. The method includes: receiving an incremental image file of the container, where the incremental image file includes a newly-added file, a modified file, and information about a deleted file, and the information about the deleted file includes a name of each deleted file and a storage path of the deleted file; updating the original image layer based on the incremental image file to obtain an updated image layer, where a state of the deleted file is set to a hidden state at the updated image layer; and overlaying a file at the updated image layer with a file at the container data layer to form an updated unified view at the view layer for use by the container, where the updated unified view does not include the deleted file whose state is set to the hidden state.

In one embodiment of the first aspect, the updating the original image layer includes: using the incremental image file as a file at a new first sublayer to form the first sublayer of the updated image layer, and using a file at an $m^{th}$ sublayer of the original image layer as a file at a new $(m+1)^{th}$ sublayer to form the $(m+1)^{th}$ sublayer of the updated image layer, where $1 \leq m \leq n$.

In one embodiment of the first aspect, the updating the original image layer includes: using the incremental image file as a file at a new first sublayer to form the first sublayer of the updated image layer, using a file at an $m^{th}$ sublayer of the original image layer as a file at a new $(m+1)^{th}$ sublayer to form the $(m+1)^{th}$ sublayer of the updated image layer, and merging a file at an $(n-1)^{th}$ sublayer of the original image layer and a file at an $n^{th}$ sublayer of the original image layer as files at a new $n^{th}$ sublayer to form the $n^{th}$ sublayer of the updated image layer, where $1 \leq m \leq n-2$.

In one embodiment of the first aspect, the merging a file at an $(n-1)^{th}$ sublayer of the original image layer and a file at an $n^{th}$ sublayer of the original image layer as files at a new $n^{th}$ sublayer to form the $n^{th}$ sublayer of the updated image layer includes: comparing the file at the $(n-1)^{th}$ sublayer of the original image layer with the file at the $n^{th}$ sublayer of the original image layer; and when a first file exists at the $(n-1)^{th}$ sublayer of the original image layer, and a file that has a same name as the first file exists at the $n^{th}$ sublayer of the original image layer, deleting the file that has the same name as the first file and that is at the $n^{th}$ sublayer of the original image layer, and merging the file at the $(n-1)^{th}$ sublayer of the original image layer and a remaining file at the $n^{th}$ sublayer of the original image layer to obtain files at the new $n^{th}$ sublayer to form the $n^{th}$ sublayer of the updated image layer.

In one embodiment of the first aspect, the merging a file at an $(n-1)^{th}$ sublayer of the original image layer and a file at an $n^{th}$ sublayer of the original image layer as files at a new $n^{th}$ sublayer to form the $n^{th}$ sublayer of the updated image layer includes: when the file at the $(n-1)^{th}$ sublayer of the original image layer includes a hidden-state description file, deleting the hidden-state description file, and deleting a file corresponding to a file name in the hidden-state description file from the $n^{th}$ sublayer of the original image layer; and merging the file at the $(n-1)^{th}$ sublayer of the original image layer and a remaining file at the $n^{th}$ sublayer of the original image layer to obtain files at the new $n^{th}$ sublayer to form the $n^{th}$ sublayer of the updated image layer.

In one embodiment of the first aspect, when a specified file is deleted from any sublayer of the updated image layer, a state of the specified file is set to a hidden state, so that the specified file is invisible to the container data layer and the view layer, where the specified file is any file.

In one embodiment of the first aspect, the method further includes: determining a target file at the updated image layer, where a priority of the target file is higher than a priority of a file that has a same name as the target file and that is at the container data layer; and when overlaying the file at the updated image layer with the file at the container data layer, setting, to a hidden state, a state of the file that has the same name as the target file and that is at the container data layer, and presenting the target file in the updated unified view.

In one embodiment of the first aspect, the method further includes: deleting the first sublayer of the updated image layer; using the file at the $m^{th}$ sublayer of the updated image layer as a file at an $(m-1)^{th}$ sublayer of a rolled-back image layer to form the $(m-1)^{th}$ sublayer of the rolled-back image layer, where $2 \le m \le n$; and overlaying a file at the rolled-back image layer with the file at the container data layer to form a rolled-back unified view at the view layer for use by the container, where the rolled-back unified view is the same as the unified view obtained after the file at the original image layer is overlaid with the file at container data layer.

According to the image upgrade method provided in the first aspect of the embodiments of the present application, layered management is implemented on container image layers. When a container image is upgraded, only an incremental part of the container needs to be downloaded. This reduces a download time and network bandwidth, reduces disk space on a device for storing the container image, and ensures, in terms of a mechanism, that container data is not lost after the upgrade, to resolve a prior-art problem that because a Linux container does not support an incremental image upgrade, bandwidth and disk resources are wasted and upgrade efficiency is low during an image upgrade.

A second aspect of the embodiments of the present application provides a device, where the device includes a memory and a processor, the memory is configured to store a container, and the processor is configured to perform the method in the embodiments of the first aspect.

A third aspect of the embodiments of the present application provides a computer program product including an instruction. When the computer program product runs on a computer, the computer is enabled to perform the method in the embodiments of the first aspect.

A fourth aspect of the embodiments of the present application provides a computer readable storage medium, the computer readable storage medium stores a computer program, and the method in the embodiments of the first aspect is implemented when the computer program is executed by a processor.

DESCRIPTION OF EMBODIMENTS

Figure 1:
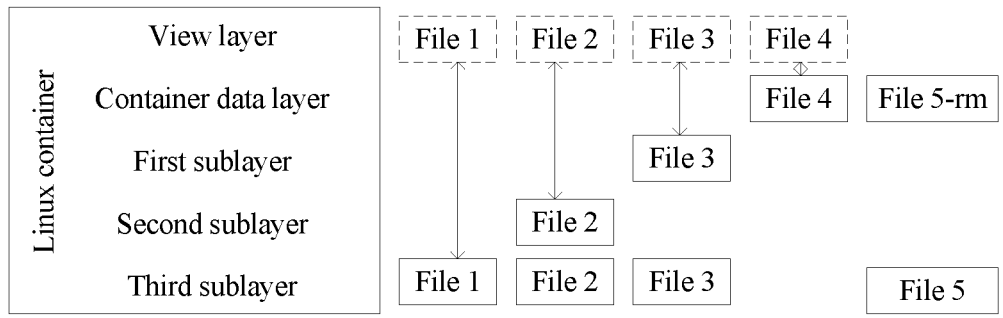
FIG. 1 is a schematic structural diagram of a file system of a Linux container.

To make the objectives, technical solutions, and advantages of embodiments of the present application clearer, the following further describes implementations of the embodiments of the present application in detail with reference to the accompanying drawings.

A Linux container includes a view layer, a container data layer, and an image layer. The image layer includes n sublayers. The view layer, the container data layer, and a first sublayer to an $n^{th}$ sublayer are sequentially located in the container, where n is greater than or equal to 1. The container data layer may be read and written, and the image layer is read only. The view layer is a unified view formed after the container data layer is overlaid with the image layer, and is also referred to as a merged point. In the Linux container provided in the embodiments of the present application, the image layer includes n sublayers. For example, n is 3. In this case, the n sublayers include a first sublayer, a second sublayer, and a third sublayer. The view layer, the container data layer, the first sublayer, the second sublayer, and the third sublayer are sequentially located in the container. A structure of the container mentioned in the embodiments of the present application is actually a structure of a file system of the container. The file system may be a root file system (rootfs). The unified view is used to present, to the container, overlaid files that belong to the container.

When the Linux container is upgraded, all files at the container data layer and the image layer are overlaid according to an OverlayFS2 overlay rule, to form a unified view at the view layer for use by the container. Two directories are used in OverlayFS. One directory is placed on the other, and a single unified view is provided for the external. The two directories are usually referred to as layers. This layered technology is referred to as union mount. In terms of terminology, a lower directory is referred to as a lowerdir, and an upper directory is referred to as an upperdir. The unified view displayed to the external is referred to as merged. A plurality of lowerdirs are added in the OverlayFS2. In the embodiments of the present application, the image layer corresponds to a lowerdir, the container data layer corresponds to an upperdir, the view layer corresponds to merged, and the image layer includes n sublayers, which correspond to n lowerdirs. The OverlayFS2 follows three rules: 1. Merge upper and lower directories, where a merged directory is a union set of files in the upper and lower directories. 2. Cover a file of a same name, where when the upper directory includes a file that has a same name as a file in the lower directory, the upper file covers the lower file, and the merged directory presents the file in the upper directory, where the files of the same name are a plurality of files that have a same name but different storage paths. For example, if there is a file A in the upper directory, and there is also a file A in the lower directory, the file A in the upper directory and the file A in the lower directory are files of a same name, and content of the files of the same name may be different. 3. Copy on write, where in an overlaid file system (the merged directory), a file is created in an upper directory. When a file is to be modified, the file is directly modified if the file is from the upper directory; or if the file is from the lower directory, the file is first copied into the upper directory and then the file is modified. When a file is to be deleted, the file is directly deleted if the file is from the upper directory; or if the file is from the lower directory, the file is hidden, so that the file is invisible in the merged directory.

FIG. 1 is a schematic structural diagram of a file system of a Linux container. The Linux container includes a view layer, a container data layer, and an image layer. The image layer includes three sublayers. A file 1 is at a third sublayer, and there is no file that has a same name as the file 1 above the third sublayer. The file 1 is directly displayed at the view layer. A file 2 is at a second sublayer, and a file that has a same name as the file 2 is at the third sublayer. According to a rule of covering a file of a same name, the file 2 at the second sublayer covers the file 2 at the third sublayer, and only the file 2 at the second sublayer is displayed at the view layer. Likewise, if a file 3 is at the third sublayer, and a file that has a same name as the file 3 is at the first sublayer, only the file 3 at the first sublayer is displayed at the view layer. A file 4 is at the container data layer, and is directly displayed at the view layer. A file 5 is at the third sublayer, and the file 5 is set to a hidden state (which is indicated by using "file name+rm" in the accompanying drawings) at the container data layer. In this case, the file 5 is not displayed at the view layer, but the file 5 is not actually deleted, and the file 5 at the third sublayer actually exists. All files in the file system are overlaid according to an overlayfs2 overlay rule, to form a unified view at the view layer for use by the container. As shown in FIG. 1, after the overlaying, files that can be used by the container include the file 1 at the third sublayer, the file 2 at the second sublayer, the file 3 at the first sublayer, and the file 4 at the container data layer, and do not include the file 5, at the third sublayer, whose state is set to the hidden state. The file whose state is set to the hidden state is not presented at the unified view.

Figure 2:
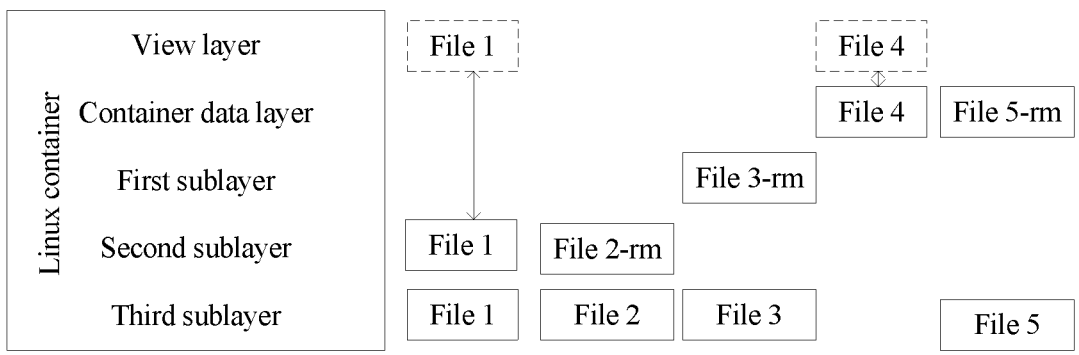
FIG. 2 is a schematic structural diagram of a file system of a Linux container in which a hidden state is set for an image layer file according to an embodiment of the present application.

FIG. 2 is a schematic structural diagram of a file system of a Linux container in which a hidden state is set for an image layer file according to an embodiment of the present application. In the structure of the file system of the Linux container in FIG. 1, a hidden state of an image layer file can be set only at the container data layer, and a hidden-state description file at the container data layer describes a file hidden at the image layer. In FIG. 2, a hidden state of a file at an image layer may be set at the image layer. In one embodiment, status information is allowed to be added for an image layer file that needs to be hidden. The status information is used to indicate that a state of the image layer file is a hidden state. A default state of the image layer file is an open state, and does not need to be additionally set. When a file is to be deleted during an image upgrade, because an image layer file is a read-only file, the original file cannot be directly deleted, and a hidden state of the file needs to be set to achieve an effect the same as that of deleting the file. Instead of actually deleting a file, a file at a first sublayer in the image layer may hide a file at a second sublayer and that at a third sublayer, and the file at the second sublayer may hide the file at the third sublayer. In one embodiment, as shown in FIG. 2, a file 2 is set to a hidden state at the second sublayer, but the file 2 is not actually deleted. The file 2 is merely invisible at a container data layer and a view layer, and the file 2 at the third sublayer is not displayed at the view layer. Likewise, a file 3 is set to a hidden state at the first sublayer, but the file 3 at the third sublayer is not actually deleted. After overlaying is performed through overlayfs2, the file 3 is not displayed at the view layer.

To set the hidden state for the image layer file at the image layer, in one embodiment, a hidden-state description file may be separately set at a first sublayer to an $(n-1)^{th}$ sublayer of the image layer. The hidden-state description file is used to record a file name of a file that is set to a hidden state and a storage path of the file.

In this embodiment of the present application, if the $(n-1)^{th}$ sublayer and an $n^{th}$ sublayer of the image layer need to be merged, and a hidden-state description file exists at the $(n-1)^{th}$ sublayer, the hidden-state description file and a file that is at the $n^{th}$ sublayer and that corresponds to a file name recorded in the hidden-state description file need to be deleted in a merging process. For example, when the file at the second sublayer in FIG. 2 needs to be merged into the third sublayer, a hidden-state description file (which records the hidden state of the file 2) at the original second sublayer and the file 2 at the original third sublayer are actually deleted.

In this application, a priority attribute may be added for the image layer file in addition to hiding, at the image layer, the image layer file. A priority of the image layer file is set to be higher than a priority of a container data layer file.

Figure 3:
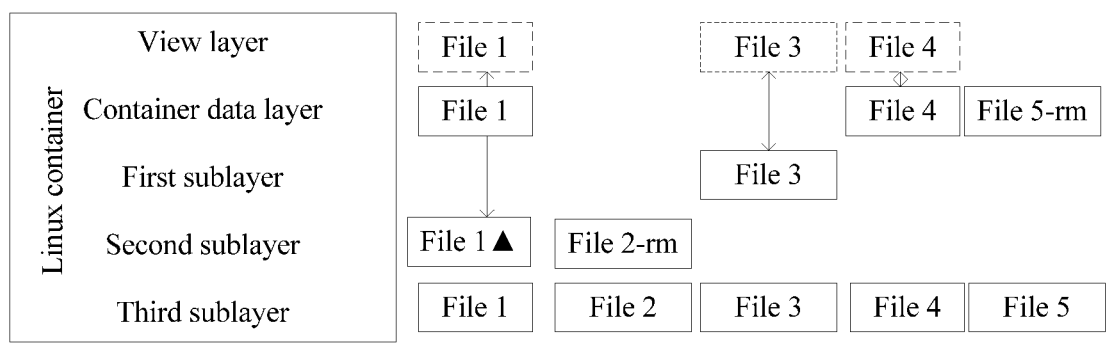
FIG. 3 is a schematic structural diagram of a file system of a Linux container in which a priority attribute is set for an image layer file according to an embodiment of the present application.

FIG. 3 is a schematic structural diagram of a file system of a Linux container in which a priority attribute is set for an image layer file according to an embodiment of the present application. In the prior art, a file at a container data layer covers a file of a same name at an image layer. However, if a file at the image layer is updated in an image upgrade process, a file that has a same name as an updated file at the image layer exists at the container data layer, and the file of the same name at the container data layer is a file before the update, covering the updated file at the image layer by using the file of the same name at the container data layer causes an update failure. To avoid the foregoing problem, this embodiment of the present application provides the file system of the Linux container to set the priority attribute for the image layer file, to record a priority of the image layer file, so that a priority of an updated image layer file is higher than a priority of a file that has a same name as the image layer file and that is at a container data layer. In this way, when the updated image layer file is overlaid with the file at the container data layer, the updated image layer file covers the file of the same name at the container data layer.

In one embodiment, as shown in FIG. 3, a file that has a same name as a file 1 exists at a container data layer, a second sublayer, and a third sublayer. The file 1 at the second sublayer is an update to the file 1 at the third sublayer. The file 1 at the second sublayer covers the file 1 at the third sublayer according to a rule of covering a file of a same name. To enable the file 1 at the second sublayer to cover the file 1 at the container data layer, a priority of the updated file 1 at the second sublayer is set to be higher than that of the file 1 (which is indicated by ▲) at the container data layer. In this case, after overlaying is performed according to an overlayfs2 overlay rule, the file 1 at the second sublayer is displayed at a view layer, so that the updated file 1 can be successfully displayed at the view layer. Similarly, a file that has a same name as a file 4 exists at the container data layer and the third sublayer, and the file 4 at the third sublayer is not updated. In this case, a priority attribute is not set for the file 4 at the third sublayer. After the container data layer and the image layer are overlaid through overlayfs2, the file 4 at the container data layer is displayed at the view layer.

Figure 4:
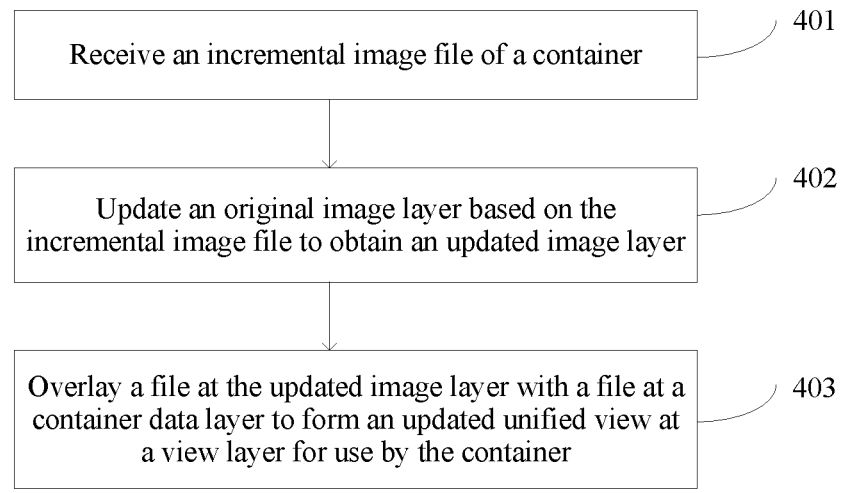
FIG. 4 is a flowchart of a Linux container image upgrade method according to an embodiment of the present application.
Figure 5:
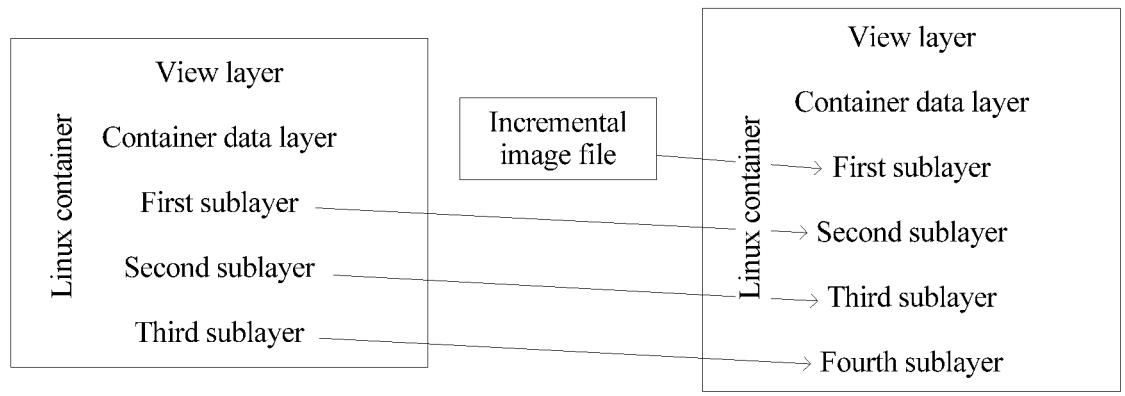
FIG. 5 is a schematic diagram of a Linux container image upgrade according to an embodiment of the present application.

FIG. 4 is a flowchart of a Linux container image upgrade method according to an embodiment of the present application. The method is applied to the container shown in FIG. 2 or FIG. 3. An image upgrade starts to be performed when the container is set to a stop state. The method is performed by a host on which the container is located or a hypervisor on the host. The container includes a view layer, a container data layer, and an original image layer. The original image layer includes a first sublayer to an $n^{th}$ sublayer. The view layer, the container data layer, and the first sublayer to the $n^{th}$ sublayer are sequentially located in the container, where $n \geq 1$. The method includes the following operations.

Operation 401: Receive an incremental image file of the container, where the incremental image file includes a newly-added file, a modified file, and information about a deleted file, and the information about the deleted file includes a name of each deleted file and a storage path of the deleted file.

The incremental image file is generated by an image file provider.

Operation 402: Update the original image layer based on the incremental image file to obtain an updated image layer, where a state of the deleted file is set to a hidden state at the updated image layer.

The deleted file is set to the hidden state at the updated image layer by setting a hidden-state description file at an image sublayer.

Operation 403: Overlay a file at the updated image layer with a file at the container data layer to form an updated unified view at the view layer for use by the container, where the updated unified view does not include the deleted file whose state is set to the hidden state.

In one embodiment, the updating the original image layer includes: using the incremental image file as a file at a new first sublayer to form the first sublayer of the updated image layer, and using a file at an $m^{th}$ sublayer of the original image layer as a file at a new $(m+1)^{th}$ sublayer to form the $(m+1)^{th}$ sublayer of the updated image layer, where $1 \leq m \leq n$.

In one embodiment, the updating the original image layer includes: using the incremental image file as a file at a new first sublayer to form the first sublayer of the updated image layer, using a file at an $m^{th}$ sublayer of the original image layer as a file at a new $(m+1)^{th}$ sublayer to form the $(m+1)^{th}$ sublayer of the updated image layer, and merging a file at an $(n-1)^{th}$ sublayer of the original image layer and a file at an $n^{th}$ sublayer of the original image layer as files at a new $n^{th}$ sublayer to form the $n^{th}$ sublayer of the updated image layer, where $1 \leq m \leq n-2$.

In either of the foregoing manners, if the incremental image file includes the information about the deleted file, a hidden-state description file needs to be created at the new first sublayer generated by using the incremental image file, where the hidden-state description file is used to record the deleted file and the storage path of the deleted file.

Figure 6:
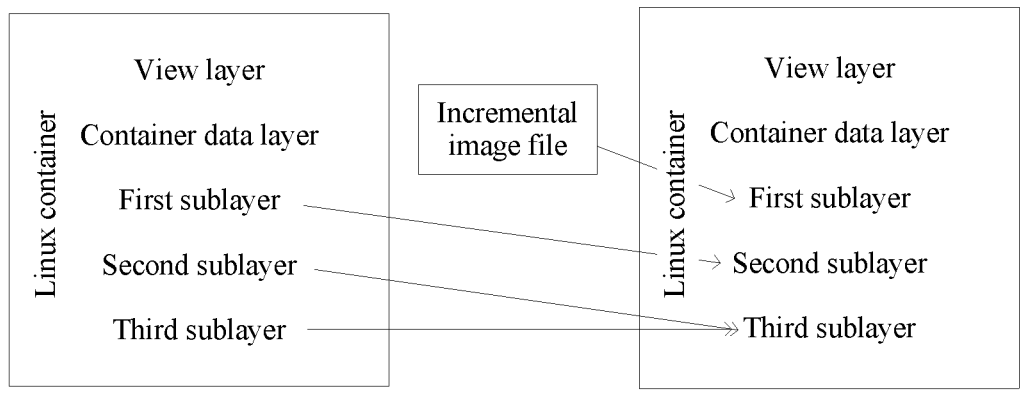
FIG. 6 is a schematic diagram of a Linux container image upgrade according to an embodiment of the present application.

When the Linux container is initially released, the original image layer of the container includes only one sublayer. The incremental image file is used as the file at the new first sublayer to form the first sublayer of the updated image layer. A file at the first sublayer of the original image layer is used as a file at a new second sublayer to form the second sublayer of the updated image layer, to complete one image update. In one embodiment of the present application, the incremental image file is used as the file at the new first sublayer to form the first sublayer of the updated image layer, a file at the first sublayer of the original image layer is used as a file at a new second sublayer to form the second sublayer of the updated image layer, and a file at a second sublayer of the original image layer and a file at a third sublayer of the original image layer are merged as files at a new third sublayer to form the third sublayer of the updated image layer, to form an updated file system structure, shown in FIG. 6, that is of the Linux container and that includes an image layer including three sublayers. The Linux container may be upgraded a plurality of times depending on an application case. To reduce space occupied by the container, a quantity of sublayers at the image layer usually does not exceed five. When there are a plurality of sublayers at the image layer, the foregoing two manners may be used to update the image layer. When there are excessive sublayers at the image layer, a last sublayer (the $n^{th}$ sublayer) can be deleted, and a hidden-state description file at a last but one sublayer (the $(n-1)^{th}$ sublayer) can be deleted, to reduce the space occupied by the container.

The container obtained through an image upgrade may be further rolled back to a previous image. When the container is set to a stop state, image rollback starts to be performed. The method is performed by a host on which the container is located or a hypervisor on the host. The method includes: deleting the first sublayer of the updated image layer; using the file at the $m^{th}$ sublayer of the updated image layer as a file at an $(m-1)^{th}$ sublayer of a rolled-back image layer to form the $(m-1)^{th}$ sublayer of the rolled-back image layer, where $2 \leq m \leq n$; and overlaying a file at the rolled-back image layer with the file at the container data layer to form a rolled-back unified view at the view layer for use by the container, where the rolled-back unified view is the same as the unified view obtained after the file at the original image layer is overlaid with the file at the container data layer.

Figure 7:
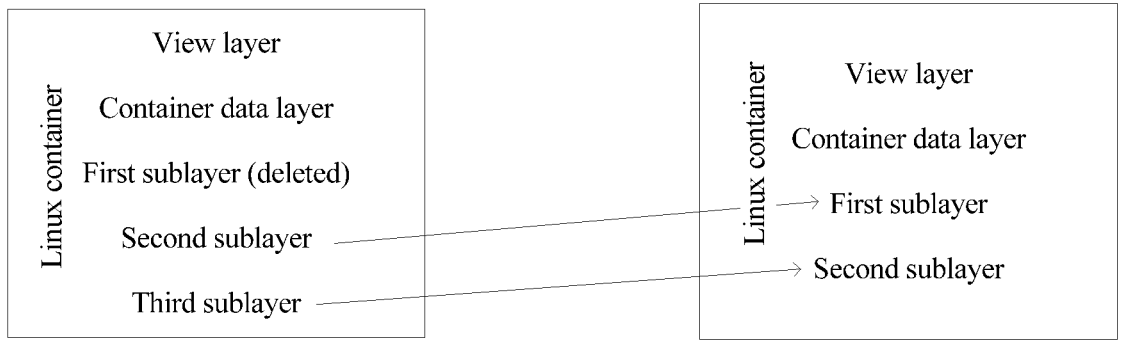
FIG. 7 is a schematic diagram of Linux container image rollback according to an embodiment of the present application.

In one embodiment of the present application, as shown in FIG. 7, the updated container image layer includes a first sublayer, a second sublayer, and a third sublayer. The first sublayer of the updated image layer is deleted. A file at the second sublayer of the updated image layer is used as a file at a first sublayer of the rolled-back image layer to form the first sublayer of the rolled-back image layer. A file at the third sublayer of the updated image layer is used as a file at a second sublayer of the rolled-back image layer to form the second sublayer of the rolled-back image layer. The file at the rolled-back image layer is overlaid with the file at the container data layer to form the rolled-back unified view at the view layer for use by the container.

There are three cases of container image upgrade: newly adding an image, modifying an existing image, and deleting an existing image. A minimum unit correspondingly processed during the Linux container image upgrade provided in this embodiment of the present application is a file. An incremental image includes a newly-added file, a modified file, and information about a deleted file. The information about the deleted file includes a name of each deleted file and a storage path of the deleted file. The following describes in detail an image upgrade for the container shown in FIG. 3 with reference to the three cases.

Figure 8:
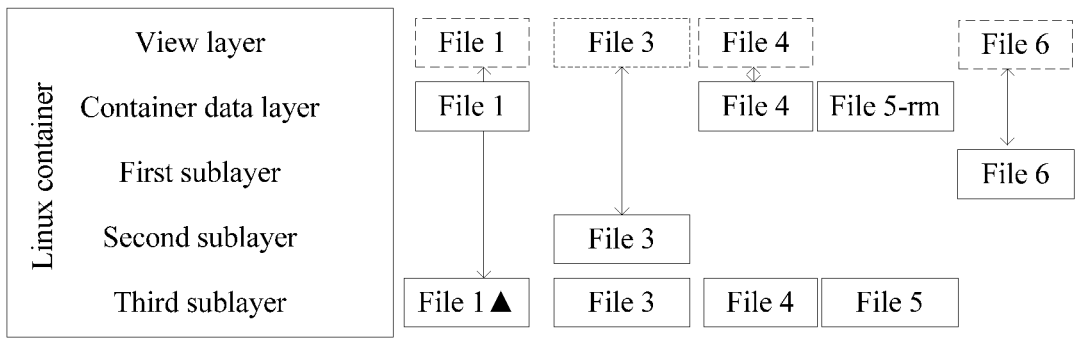
FIG. 8 is a schematic diagram of a method for newly adding a file at an image layer of a Linux container according to Embodiment 1 of the present application.

FIG. 8 is a schematic diagram of a method for newly adding a file at an image layer of a Linux container according to Embodiment 1 of the present application. It is assumed that an original image layer is the image layer shown in FIG. 3. An incremental image file includes a newly-added file 6. In this case, the file 6 is used as a file at a new first sublayer to form the first sublayer of an updated image layer, and a file 3 at a first sublayer of the original image layer is used as a file at a new second sublayer to form the second sublayer of the updated image layer. When a file 1 exists at a second sublayer of the original image layer, and a file that has a same name as the file 1 exists at a third sublayer of the original image layer, the file 1 at the third sublayer of the original image layer is deleted. In addition, when a hidden-state description file 2-*rm* of a file 2 at the third sublayer exists at the second sublayer of the original image layer, the hidden-state description file 2-*rm* is deleted, and the file 2 corresponding to the hidden-state description file 2-*rm* is deleted from the third sublayer of the original image layer. The file 1 at the second sublayer of the original image layer and a file 3, a file 4, and a file 5 at the third sublayer of the original image layer are merged to obtain files at a new third sublayer, to form the third sublayer of the updated image layer. The third sublayer of the updated image layer includes the file 1, the file 3, the file 4, and the file 5.

According to an overlayfs2 file overlay rule, in the container whose image layer is updated, the file 1 exists at the third sublayer and is an updated file, and a file 1 of a same name exists at a container data layer and is a file that is not updated. In this case, a priority of the file 1 at the third sublayer is set to be higher than a priority of the file 1 at the container data layer, and the file 1 at the third sublayer is displayed at a view layer. The files 3 of a same name exist at the second sublayer and the third sublayer. According to a rule of covering a file of a same name, the file 3 at the third sublayer is invisible to the view layer, and the file 3 at the second sublayer is displayed at the view layer. The file 4 exists at the third sublayer and is a file that is not updated, and a file 4 of a same name exists at the container data layer. In this case, a priority of the file 4 at the container data layer is higher than a priority of the file 4 at the third sublayer, and the file 4 at the container data layer is displayed at the view layer. Because a file 5-*rm* that records a hidden state of the file 5 at the third sublayer exists at the container data layer, the file 5 at the third sublayer is not displayed at the view layer. A unified view including the file 1 at the third sublayer, the file 3 at the second sublayer, the file 4 at the container data layer, and the file 6 at the first sublayer is formed at the view layer through overlaying for use by the container.

Figure 9:
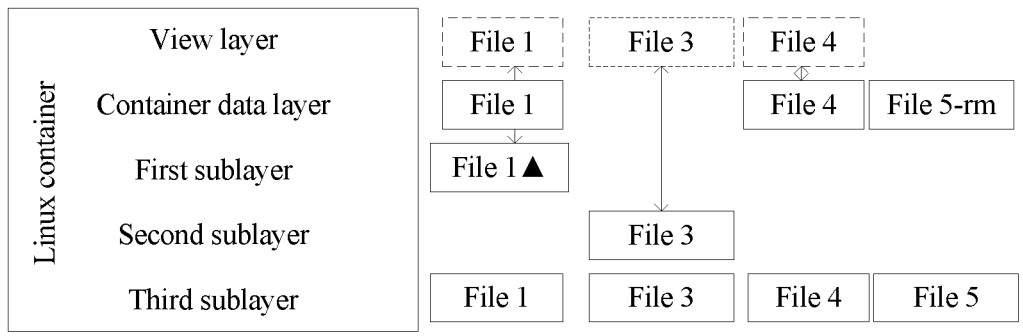
FIG. 9 is a schematic diagram of a method for modifying a file at an image layer of a Linux container according to Embodiment 2 of the present application.

FIG. 9 is a schematic diagram of a method for modifying a file at an image layer of a Linux container according to Embodiment 2 of the present application. It is assumed that an original image layer is the image layer shown in FIG. 3. An incremental image file includes a file that is obtained by modifying a file 1 at an original second sublayer and that is named a file 1. In this case, the file 1 is used as a file at a new first sublayer to form the first sublayer of an updated image layer. Because the file 1 in the incremental image file is an updated file, a priority of the file 1 in the incremental image file is set to be higher than a priority of a file 1 (which is indicated by using ▲) at a container data layer. A file 3 at a first sublayer of the original image layer is used as a file at a new second sublayer to form the second sublayer of the updated image layer. When the file 1 exists at the second sublayer of the original image layer, and a file that has a same name as the file 1 exists at a third sublayer of the original image layer, the file 1 at the third sublayer of the original image layer is deleted. In addition, when a hidden-state description file 2-*rm* of a file 2 at the third sublayer exists at the second sublayer of the original image layer, the hidden-state description file 2-*rm* is deleted, and the file 2 corresponding to the hidden-state description file 2-*rm* is deleted from the third sublayer of the original image layer. The file 1 at the second sublayer of the original image layer and a file 3, a file 4, and a file 5 at the third sublayer of the original image layer are merged to obtain files at a new third sublayer, to form the third sublayer of the updated image layer. The third sublayer of the updated image layer includes the file 1, the file 3, the file 4, and the file 5.

According to an overlayfs2 file overlay rule, in the container whose image layer is updated, the file 1 exists at the first sublayer, and the file 1 of a same name exists at the third sublayer. According to a rule of covering a file of a same name, the file 1 at the first sublayer covers the file 1 at the third sublayer. Because the file 1 at the first sublayer is a file updated this time, and the file 1 of a same name exists at the container data layer and is a file that is not updated, a priority of the file 1 at the first sublayer is set to be higher than a priority of the file 1 at the container data layer, and the file 1 at the first sublayer is displayed at a view layer. The files 3 of a same name exist at the second sublayer and the third sublayer. According to the rule of covering a file of a same name, the file 3 at the third sublayer is invisible to the view layer, and the file 3 at the second sublayer is displayed at the view layer. The file 4 exists at the third sublayer and is a file that is not updated, and a file 4 of a same name exists at the container data layer. In this case, a priority of the file 4 at the container data layer is higher than a priority of the file 4 at the third sublayer, and the file 4 at the container data layer is displayed at the view layer. Because a file 5-*rm* that records a hidden state of the file 5 at the third sublayer exists at the container data layer, the file 5 at the third sublayer is not displayed at the view layer. A unified view including the file 1 at the first sublayer, the file 3 at the second sublayer, and the file 4 at the container data layer is formed at the view layer through overlaying for use by the container.

Figure 10:
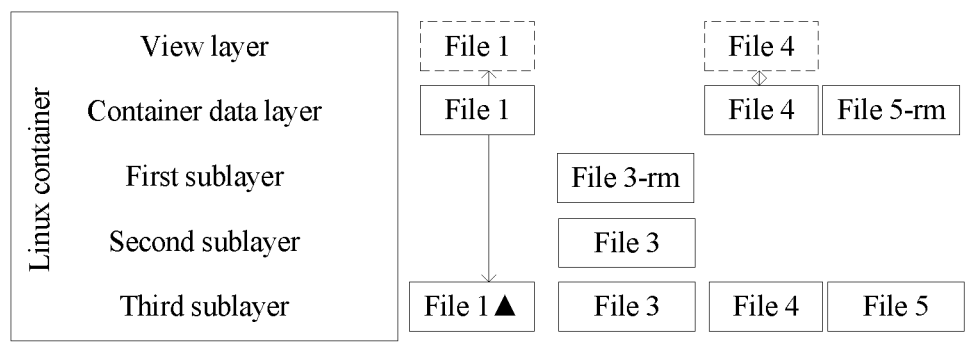
FIG. 10 is a schematic diagram of a method for deleting a file from an image layer of a Linux container according to Embodiment 3 of the present application.

FIG. 10 is a schematic diagram of a method for deleting a file from an image layer of a Linux container according to Embodiment 3 of the present application. It is assumed that an original image layer is the image layer shown in FIG. 3. An incremental image file includes information about a deleted file: a file 3 at a first sublayer at the original image layer. In this case, a hidden-state description file is generated at a first sublayer generated by using the incremental image file, and is used to record a name and a storage path (namely, a real storage path of the file 3, where the file 3 can be found by using the storage path) of the file 3. The hidden-state description file is used as a file at a new first sublayer to form the first sublayer of an updated image layer. The file 3 at the first sublayer of the original image layer is used as a file at a new second sublayer to form the second sublayer of the updated image layer. When a file 1 exists at a second sublayer of the original image layer, and a file that has a same name as the file 1 exists at a third sublayer of the original image layer, the file 1 at the third sublayer of the original image layer is deleted. In addition, when a hidden-state description file 2-*rm* of a file 2 at the third sublayer exists at the second sublayer of the original image layer, the hidden-state description file 2-*rm* is deleted, and the file 2 corresponding to the hidden-state description file 2-*rm* is deleted from the third sublayer of the original image layer. The file 1 at the second sublayer of the original image layer and a file 3, a file 4, and a file 5 at the third sublayer of the original image layer are merged to obtain files at a new third sublayer, to form the third sublayer of the updated image layer. The third sublayer of the updated image layer includes the file 1, the file 3, the file 4, and the file 5.

According to an overlayfs2 file overlay rule, in the container whose image layer is updated, the file 1 exists at the third sublayer and is an updated file, and a file 1 of a same name exists at a container data layer and is a file that is not updated. In this case, a priority of the file 1 at the third sublayer is set to be higher than a priority of the file 1 (which is indicated by using ▲) at the container data layer, and the file 1 at the third sublayer is displayed at a view layer. The files 3 of a same name exist at the second sublayer and the third sublayer. According to a rule of covering a file of a same name, the file 3 at the third sublayer is invisible to the view layer. In addition, the first sublayer includes a file used to record a hidden attribute of the file 3 at the first sublayer of the original image layer, and the file 3 at the second sublayer is invisible to the view layer. The file 4 exists at the third sublayer and is a file that is not updated, and a file 4 of a same name exists at the container data layer. In this case, a priority of the file 4 at the container data layer is higher than a priority of the file 4 at the third sublayer, and the file 4 at the container data layer is displayed at the view layer. Because a file 5-*rm* that records a hidden state of the file 5 at the third sublayer exists at the container data layer, the file 5 at the third sublayer is not displayed at the view layer. A unified view including the file 1 at the third sublayer and the file 4 at the container data layer is formed at the view layer through overlaying for use by the container.

In FIG. 8, FIG. 9, and FIG. 10, an upgraded Linux container is formed. Afterwards, the first sublayer of the updated image layer may be deleted. The file at the second sublayer of the updated image layer is used as a file at a first sublayer of a rolled-back image layer to form the first sublayer of the rolled-back image layer. The file at the third sublayer of the updated image layer is used as a file at a second sublayer of the rolled-back image layer to form the second sublayer of the rolled-back image layer. A file at the rolled-back image layer is overlaid with the file at the container data layer to form, at the view layer for use by the container, a unified view that is the same as that shown in FIG. 3. The image layer of the Linux container provided in this embodiment of the present application can be upgraded a plurality of times and can be rolled back a plurality of times.

Figure 11:
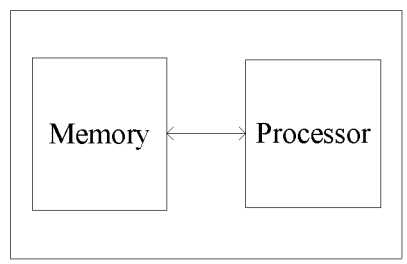
FIG. 11 is a schematic structural diagram of a device according to an embodiment of the present application.

FIG. 11 is a schematic structural diagram of a device according to an embodiment of the present application. The device includes a processor and a memory. The memory may be connected to the processor through a bus. The memory may be a nonvolatile memory, such as a hard disk drive or a flash memory, and the memory stores a software program and a device driver. The software program can execute various functions of the foregoing method provided in the embodiments of the present application, and the device driver may be a network and interface driver. The processor is configured to execute the software program. When the software program is executed, the method provided in the embodiments of the present application can be implemented.

It should be noted that an embodiment of the present application further provides a computer readable storage medium. The computer readable storage medium stores a computer program. When the computer program is executed by a processor, the method provided in this embodiment of the present application can be implemented.

An embodiment of the present application further provides a computer program product including an instruction. When the computer program product runs on a computer, the computer is enabled to perform the foregoing method.

According to the image upgrade method and the device provided in the embodiments of the present application, layered management is implemented on container image layers. When a container image is upgraded, only an incremental part of the container needs to be downloaded. This reduces a download time and network bandwidth, reduces disk space on the device for storing the container image, and ensures, in terms of a mechanism, that container data is not lost after the upgrade, to resolve a prior-art problem that because a Linux container does not support an incremental image upgrade, bandwidth and disk resources are wasted and upgrade efficiency is low during an image upgrade.

In addition to a Linux container in an overlayfs2 application scenario, in a device with limited resources, the image upgrade method provided in the foregoing embodiments may be applied to a file change and upgrade scenario and scenarios of all overlaid file systems that require an underlying change to affect an upper layer.

The foregoing descriptions are merely implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. An image upgrade method, wherein the method is applied to a container, the container comprising: a view layer, a container data layer, and an original image layer; and the original image layer comprising: a first sublayer to an $n^{th}$ sublayer; the view layer, the container data layer, and the first sublayer to the $n^{th}$ sublayer being sequentially located in the container, wherein n≥1; and the method comprises:
   receiving an incremental image file of the container, wherein the incremental image file comprises a newly-added file, a modified file, and information about a deleted file, and the information about the deleted file comprises a name of each deleted file and a storage path of the deleted file;
   updating the original image layer based on the incremental image file to obtain an updated image layer, wherein a state of the deleted file is set to a hidden state at the updated image layer; and
   overlaying a file at the updated image layer with a file at the container data layer to form an updated unified view at the view layer for use by the container, wherein the updated unified view does not include the deleted file whose state is set to the hidden state.

2. The method according to claim 1, wherein the updating the original image layer comprises: using the incremental image file as a file at a new first sublayer to form the first sublayer of the updated image layer, and using a file at an $m^{th}$ sublayer of the original image layer as a file at a new $(m+1)^{th}$ sublayer to form the $(m+1)^{th}$ sublayer of the updated image layer, wherein 1≤m≤n.

3. The method according to claim 1, wherein the updating the original image layer comprises: using the incremental image file as a file at a new first sublayer to form the first sublayer of the updated image layer, using a file at an $m^{th}$ sublayer of the original image layer as a file at a new $(m+1)^{th}$ sublayer to form the $(m+1)^{th}$ sublayer of the updated image layer, and merging a file at an $(n-1)^{th}$ sublayer of the original image layer and a file at an $n^{th}$ sublayer of the original image layer as files at a new $n^{th}$ sublayer to form the $n^{th}$ sublayer of the updated image layer, wherein 1≤m≤n−2.

4. The method according to claim 3, wherein the merging a file at an $(n-1)^{th}$ sublayer of the original image layer and a file at an $n^{th}$ sublayer of the original image layer as files at a new $n^{th}$ sublayer to form the $n^{th}$ sublayer of the updated image layer comprises: comparing the file at the $(n-1)^{th}$ sublayer of the original image layer with the file at the $n^{th}$ sublayer of the original image layer; and when a first file exists at the $(n-1)^{th}$ sublayer of the original image layer, and a file that has a same name as the first file exists at the $n^{th}$ sublayer of the original image layer, deleting the file that has the same name as the first file and that is at the $n^{th}$ sublayer of the original image layer, and merging the file at the $(n-1)^{th}$ sublayer of the original image layer and a remaining file at the $n^{th}$ sublayer of the original image layer to obtain files at the new $n^{th}$ sublayer to form the $n^{th}$ sublayer of the updated image layer.

5. The method according to claim 3, wherein the merging a file at an $(n-1)^{th}$ sublayer of the original image layer and a file at an $n^{th}$ sublayer of the original image layer as files at a new $n^{th}$ sublayer to form the $n^{th}$ sublayer of the updated image layer comprises: when the file at the $(n-1)^{th}$ sublayer of the original image layer comprises a hidden-state description file, deleting the hidden-state description file, and deleting a file corresponding to a file name in the hidden-state description file from the $n^{th}$ sublayer of the original image layer; and merging the file at the $(n-1)^{th}$ sublayer of the original image layer and a remaining file at the $n^{th}$ sublayer of the original image layer to obtain files at the new $n^{th}$ sublayer to form the $n^{th}$ sublayer of the updated image layer.

6. The method according to claim 1, wherein when a specified file is deleted from any sublayer of the updated image layer, a state of the specified file is set to a hidden state, so that the specified file is invisible to the container data layer and the view layer, wherein the specified file is any file.

7. The method according to claim 1, wherein the method further comprises:
    determining a target file at the updated image layer, wherein a priority of the target file is higher than a priority of a file that has a same name as the target file and that is at the container data layer; and
    when overlaying the file at the updated image layer with the file at the container data layer, setting, to a hidden state, a state of the file that has the same name as the target file and that is at the container data layer, and presenting the target file in the updated unified view.

8. The method according claim 1, wherein the method further comprises:
    deleting the first sublayer of the updated image layer;
    using the file at an $m^{th}$ sublayer of the updated image layer as a file at an $(m-1)^{th}$ sublayer of a rolled-back image layer to form the $(m-1)^{th}$ sublayer of the rolled-back image layer, wherein $2 \le m \le n$; and
    overlaying a file at the rolled-back image layer with the file at the container data layer to form a rolled-back unified view at the view layer for use by the container, wherein the rolled-back unified view is the same as a unified view obtained after a file at the original image layer is overlaid with the file at container data layer.

9. A device comprising:
    a memory; and
    a processor, wherein, the memory is configured to store a container, the container comprises: a view layer, a container data layer, and an original image layer; and the original image layer comprises: a first sublayer to an $n^{th}$ sublayer; the view layer, the container data layer, and the first sublayer to the $n^{th}$ sublayer being sequentially located in the container, wherein $n \ge 1$; and the processor is configured to perform the following method:
    receiving an incremental image file of the container, wherein the incremental image file comprises a newly-added file, a modified file, and information about a deleted file, and the information about the deleted file comprises a name of each deleted file and a storage path of the deleted file;
    updating the original image layer based on the incremental image file to obtain an updated image layer, wherein a state of the deleted file is set to a hidden state at the updated image layer; and
    overlaying a file at the updated image layer with a file at the container data layer to form an updated unified view at the view layer for use by the container, wherein the updated unified view does not include the deleted file whose state is set to the hidden state.

10. The device according to claim 9, wherein the updating the original image layer comprises: using the incremental image file as a file at a new first sublayer to form the first sublayer of the updated image layer, and using a file at an $m^{th}$ sublayer of the original image layer as a file at a new $(m+1)^{th}$ sublayer to form the $(m+1)^{th}$ sublayer of the updated image layer, wherein $1 \le m \le n$.

11. The device according to claim 9, wherein the updating the original image layer comprises: using the incremental image file as a file at a new first sublayer to form the first sublayer of the updated image layer, using a file at an $m^{th}$ sublayer of the original image layer as a file at a new $(m+1)^{th}$ sublayer to form the $(m+1)^{th}$ sublayer of the updated image layer, and merging a file at an $(n-1)^{th}$ sublayer of the original image layer and a file at an $n^{th}$ sublayer of the original image layer as files at a new $n^{th}$ sublayer to form the $n^{th}$ sublayer of the updated image layer, wherein $1 \le m \le n-2$.

12. The device according to claim 11, wherein the merging a file at an $(n-1)^{th}$ sublayer of the original image layer and a file at an $n^{th}$ sublayer of the original image layer as files at a new $n^{th}$ sublayer to form the $n^{th}$ sublayer of the updated image layer comprises: comparing the file at the $(n-1)^{th}$ sublayer of the original image layer with the file at the $n^{th}$ sublayer of the original image layer; and when a first file exists at the $(n-1)^{th}$ sublayer of the original image layer, and a file that has a same name as the first file exists at the $n^{th}$ sublayer of the original image layer, deleting the file that has the same name as the first file and that is at the $n^{th}$ sublayer of the original image layer, and merging the file at the $(n-1)^{th}$ sublayer of the original image layer and a remaining file at the $n^{th}$ sublayer of the original image layer to obtain files at the new $n^{th}$ sublayer to form the $n^{th}$ sublayer of the updated image layer.

13. The device according to claim 11, wherein the merging a file at an $(n-1)^{th}$ sublayer of the original image layer and a file at an $n^{th}$ sublayer of the original image layer as files at a new $n^{th}$ sublayer to form the $n^{th}$ sublayer of the updated image layer comprises: when the file at the $(n-1)^{th}$ sublayer of the original image layer comprises a hidden-state description file, deleting the hidden-state description file, and deleting a file corresponding to a file name in the hidden-state description file from the $n^{th}$ sublayer of the original image layer; and merging the file at the $(n-1)^{th}$ sublayer of the original image layer and a remaining file at the $n^{th}$ sublayer of the original image layer to obtain files at the new $n^{th}$ sublayer to form the $n^{th}$ sublayer of the updated image layer.

14. The device according to claim 9, wherein when a specified file is deleted from any sublayer of the updated image layer, a state of the specified file is set to a hidden state, so that the specified file is invisible to the container data layer and the view layer, wherein the specified file is any file.

15. The device according to claim 9, wherein the method further comprises:

determining a target file at the updated image layer, wherein a priority of the target file is higher than a priority of a file that has a same name as the target file and that is at the container data layer; and when overlaying the file at the updated image layer with the file at the container data layer, setting, to a hidden state, a state of the file that has the same name as the target file and that is at the container data layer, and presenting the target file in the updated unified view.

16. The device according claim 9, wherein the method further comprises:

deleting the first sublayer of the updated image layer;

using the file at an $m^{th}$ sublayer of the updated image layer as a file at an $(m-1)^{th}$ sublayer of a rolled-back image layer to form the $(m-1)^{th}$ sublayer of the rolled-back image layer, wherein $2 \leq m \leq n$; and overlaying a file at the rolled-back image layer with the file at the container data layer to form a rolled-back unified view at the view layer for use by the container, wherein the rolled-back unified view is the same as a unified view obtained after a file at the original image layer is overlaid with the file at container data layer.

17. A non-transitory computer-readable medium having instructions stored therein, which when executed by a processor, cause the processor to perform an image upgrade method, wherein the method is applied to a container, the container comprising: a view layer, a container data layer, and an original image layer; and the original image layer comprising: a first sublayer to an $n^{th}$ sublayer; the view layer, the container data layer, and the first sublayer to the $n^{th}$ sublayer being sequentially located in the container, wherein $n \geq 1$; and the method comprising:

receiving an incremental image file of the container, wherein the incremental image file comprises a newly-added file, a modified file, and information about a deleted file, and the information about the deleted file comprises a name of each deleted file and a storage path of the deleted file;

updating the original image layer based on the incremental image file to obtain an updated image layer, wherein a state of the deleted file is set to a hidden state at the updated image layer; and overlaying a file at the updated image layer with a file at the container data layer to form an updated unified view at the view layer for use by the container, wherein the updated unified view does not include the deleted file whose state is set to the hidden state.

18. The computer-readable medium according to claim 17, wherein the updating the original image layer comprises: using the incremental image file as a file at a new first sublayer to form the first sublayer of the updated image layer, and using a file at an $m^{th}$ sublayer of the original image layer as a file at a new $(m+1)^{th}$ sublayer to form the $(m+1)^{th}$ sublayer of the updated image layer, wherein $1 \leq m \leq n$.

19. The computer-readable medium according to claim 17, wherein the updating the original image layer comprises: using the incremental image file as a file at a new first sublayer to form the first sublayer of the updated image layer, using a file at an $m^{th}$ sublayer of the original image layer as a file at a new $(m+1)^{th}$ sublayer to form the $(m+1)^{th}$ sublayer of the updated image layer, and merging a file at an $(n-1)^{th}$ sublayer of the original image layer and a file at an $n^{th}$ sublayer of the original image layer as files at a new $n^{th}$ sublayer to form the $n^{th}$ sublayer of the updated image layer, wherein $1 \leq m \leq n-2$.

20. The computer-readable medium according to claim 19, wherein the merging a file at an $(n-1)^{th}$ sublayer of the original image layer and a file at an $n^{th}$ sublayer of the original image layer as files at a new $n^{th}$ sublayer to form the $n^{th}$ sublayer of the updated image layer comprises: comparing the file at the $(n-1)^{th}$ sublayer of the original image layer with the file at the $n^{th}$ sublayer of the original image layer; and when a first file exists at the $(n-1)^{th}$ sublayer of the original image layer, and a file that has a same name as the first file exists at the $n^{th}$ sublayer of the original image layer, deleting the file that has the same name as the first file and that is at the $n^{th}$ sublayer of the original image layer, and merging the file at the $(n-1)^{th}$ sublayer of the original image layer and a remaining file at the $n^{th}$ sublayer of the original image layer to obtain files at the new $n^{th}$ sublayer to form the $n^{th}$ sublayer of the updated image layer.

\* \* \* \* \*